UNITED STATES PATENT OFFICE.

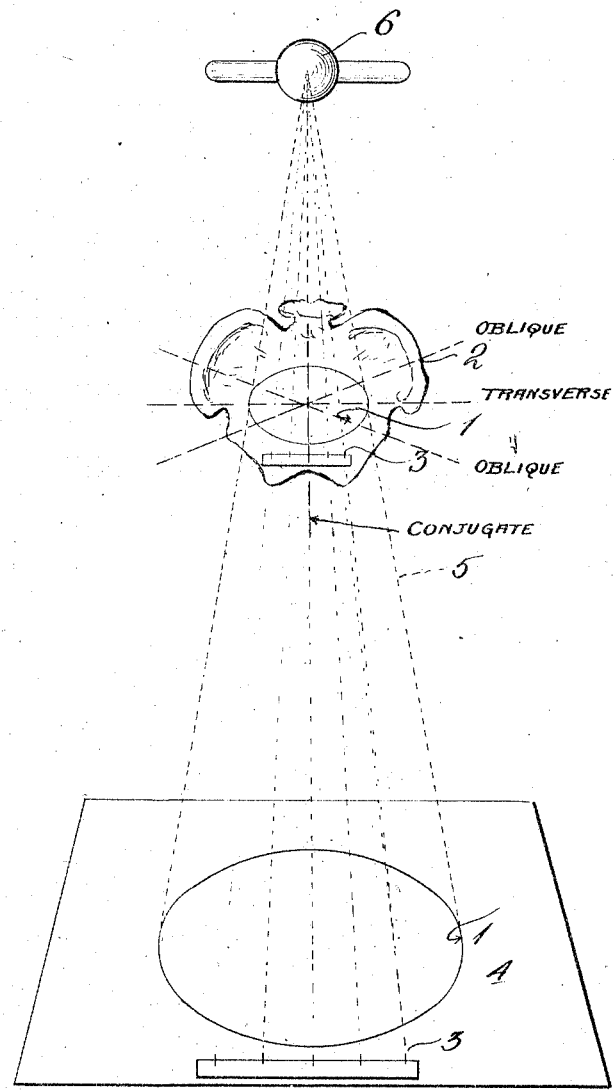

EDWARD E. BROSTROM, OF LOS ANGELES, CALIFORNIA.

METHOD OF MEASURING CONCEALED OBJECTS.

1,396,920.  Specification of Letters Patent.  Patented Nov. 15, 1921.

Application filed January 17, 1920. Serial No. 353,360.

*To all whom it may concern:*

Be it known that I, EDWARD E. BROSTROM, a citizen of the United States, residing at Los Angeles, county of Los Angeles, and State of California, have invented a certain new and useful Method of Measuring Concealed Objects, of which the following is a specification.

This invention relates to a means for measuring objects or spaces hidden from view or contained in opaque substances or materials, and it has especial reference to a method of determining with precision the dimensions of bodies thus concealed in a mass or masses of material impervious to light, an object of the invention being to provide a simple, efficient and accurate method of measurement of concealed objects, spaces or structure from an image or record of the same made on a negative plate or film.

The accompanying drawing is illustrative of the application of the method in one field, to wit, osteological science, where, for instance, the ascertainment of the dimensions of the inlet and outlet of the female bony pelvis will in advance determine conditions liable or apt to develop and be met with during pregnancy and labor, and prior, and which will guide a physician in the care and treatment of a patient and in his determination of the possibility of parturition.

The figure is a schematic view, showing a bony pelvis, a plate upon which the image thereof is to be recorded, and the source of penetrative ray.

In general, the invention involves the accurate and true calculation of dimensional areas of concealed objects, bodies or structures by making an X-ray picture of the object to be measured and of unknown dimensions, in association or combination with an object or objects of predetermined or known dimensions used as a coefficient, and specifically the invention comprises the placement or disposition of a body or association of bodies or objects of calculated and known dimensions, distance or separation, on a plane parallel with the object, body or structure of unknown dimensions, and in close association with or proximity to said body, but which body, for instance in medical work, may be located and certain landmarks thereof established. The objects or elements of known dimension may comprise acuminate members or very fine points, which may be so disposed and supported that only the extreme ends lie within the focal plane of the primary Roentgen ray.

Herein the term "inlet" refers to the brim of the true pelvis, also designated the "superior" strait; it is also designated the "anatomical inlet," of the true pelvis, as distinguished from the false pelvis. The term "outlet" refers to the outlet of the true pelvis or, as it is also termed "the inferior strait."

Referring to the illustration, the horizontal plane of the inlet 1, of the human bony pelvis 2, being first determined, points or other acuminate elements 3, definitely distanced or separated from each other, are placed in the same plane as the inlet or outlet the measurement of which is to be calculated.

These elements 3 may be embedded in a substance permeable to light and represent units of measurement, for which purpose the opaque bodies or elements 3 are determinately spaced.

These opaque bodies or elements are recorded upon the photographic plate with the object photographed. It is required that the plate or film 4, be parallel to the plane of the concealed object to be calculated and pictured and within the penetration area of the rays and that the rays 5 of the Roentgen projector 6 be at right angles to both the object 1 and the plate 4, which obviously must be centrally located.

The imprint of the object 1, and modulus 3, show the ratio of enlargement of the object and the spaces between the elements of the modulus to be the same. Therefore the accurate measurement of the pelvic inlet or outlet is obtained in the following manner.

To the physician the ascertainment of the measurements of those axes into which a human pelvis is divided is of the greatest importance and these axes comprise the following, to-wit: the conjugate axis or conjugate, which refers to an imaginary line extending from the tip of the sacral promontary to the middle and top of the pubyc symphisis; the transverse axis, which refers to an imaginary line across the greatest diameter of the inlet; and the oblique axes, which refers to imaginary lines diverging from the sacro-iliac articulation to the ileo pectineal eminence of the inlet. The oblique axes bisect the transverse and conjugate axes.

The inlet is accurately measured, say in millimeters, from the aforementioned known landmarks of the pelvis, as appearing upon the plate.

The resulting measurements, that is, in the accompanying illustration, those most necessary to the obstetrical branch of asteology, namely the conjugate, transverse and oblique axes or diameters of the pelvic inlet, etc., are then each divided by the distance, in millimeters, represented by the spaces between the opaque bodies in the modulus, then multiplied by the dimension of the known object and the result will be the correct measurement; for instance:

Say the transverse axis of the enlarged picture or image measures 12 centimeters; the oblique axis, 12 centimeters, and the conjugate axis, 11.8 centimeters.

The markings or spacings on the modulus represent 25.4 millimeters, or exactly one inch apart. Upon this enlarged image, the distance between the markings of the modulus is 28 millimeters. The modulus on the photographic plate being enlarged in the same ratio as the object photographed, the true measurement of the photographed object is arrived at by dividing 28 millimeters into 118 millimeters equals 4.21 times. 4.21 times 25.4, (actual size of coefficient in millimeters), equals 106.9 millimeters which on being reduced to centimeters equals 10.69 centimeters. (A small fraction is discarded in the product of 28 into 118.)

2. Dividing 28 millimeters into 120 millimeters equals 4.28 times. 4.28 times 25.4 (actual size of coefficient in millimeters), equals 108.7 millimeters, which on being reduced to centimeters, equals 10.87 centimeters. (A small fraction is discarded in the product of 28 into 120.)

3. Same as foregoing.

The measurements obtained by this method are accurate measurements of the concealed object, space or structure brought to light upon a negative or photographic plate and obviously, the predetermination of the actual measurement or dimension of a bony structure will indicate whether normal processes of nature are possible and the steps necessary if abnormality exists.

What I claim, is:—

The method of measuring concealed objects or spaces, consisting in disposing the object of unknown dimension in a plane parallel to the sensitive plate, the object to be measured and the plate being at right angles to the general direction of rays issuing from a predetermined common point, setting an object of known dimensions in the same plane as the object of unknown dimensions, making the exposure by means of actinic rays issuing from said point, measuring the distances desired on the negative, dividing such measurements by the dimension of the image on the negative of the object of known dimension, and finally multiplying the result by the dimension of the known object.

In testimony whereof I have set my hand.

EDWARD E. BROSTROM.